(12) United States Patent
Lal et al.

(10) Patent No.: US 11,075,809 B2
(45) Date of Patent: Jul. 27, 2021

(54) METHODS AND APPARATUS TO DEPLOY SECURITY-COMPLIANT WORKLOAD DOMAINS

(71) Applicant: VMWARE, INC., Palo Alto, CA (US)

(72) Inventors: Naren Lal, Bangalore (IN); Ranganathan Srinivasan, Bangalore (IN); Vipul Chaudhary, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/788,326

(22) Filed: Feb. 12, 2020

(65) Prior Publication Data
US 2021/0184928 A1    Jun. 17, 2021

(30) Foreign Application Priority Data
Dec. 11, 2019    (IN) .............................. 201941051305

(51) Int. Cl.
*H04L 29/08*    (2006.01)
*H04L 12/24*    (2006.01)
*H04L 29/06*    (2006.01)

(52) U.S. Cl.
CPC ...... *H04L 41/0869* (2013.01); *H04L 41/0843* (2013.01); *H04L 41/5048* (2013.01); *H04L 63/0876* (2013.01); *H04L 63/20* (2013.01)

(58) Field of Classification Search
CPC .. H04L 41/0869; H04L 41/5048; H04L 63/20
See application file for complete search history.

(56) References Cited

U.S. PATENT DOCUMENTS

| 6,735,701 B1 * | 5/2004 | Jacobson | ................ H04L 29/06 726/1 |
| 7,536,456 B2 * | 5/2009 | Williams | ............ H04L 41/0853 370/401 |
| 2017/0149880 A1 * | 5/2017 | Lochhead | ................ G06F 9/00 |

FOREIGN PATENT DOCUMENTS

WO    WO-2011034457 A1 *    3/2011    ......... H04L 41/0843

OTHER PUBLICATIONS

"Create a Virtual Infrastructure Workload Domain," VMware Inc., Dec. 20, 2018, Retrieved from the Internet: <https://docs.vmware.com/en/VMware-Cloud-Foundation/3.0/com.vmware.vcf.admin.doc_30/GUID-3A478CF8-AFF8-43D9-9635-4E40A0E372AD.html> 4 pages.

* cited by examiner

*Primary Examiner* — Chirag R Patel
(74) *Attorney, Agent, or Firm* — Hanley, Flight & Zimmerman, LLC

(57) ABSTRACT

An example apparatus to configure a workload domain for security compliance includes a configuration normalizer to generate normalized workload domain configuration settings by normalizing workload domain configuration settings of a deployed workload domain based on a format of compliance configuration settings; a drift comparator to compare the normalized workload domain configuration settings with the compliance configuration settings before deploying an application in the workload domain; a post start-up controller to generate updated workload domain configuration settings by modifying ones of the workload domain configuration settings, the modifying of the ones of the workload domain configuration settings being based on the comparison of the normalized workload domain configuration settings with the compliance configuration settings; and a compliance verifier to determine whether the (Continued)

updated workload domain configuration settings satisfy the compliance configuration settings.

24 Claims, 12 Drawing Sheets

```
Input spec
{
 "comparableVCenterConfig": [
  "version"
 ],
 "comparableNsxManagerConfig": [
  "version",
  "ntpServers",
  "buildNumber",
  "backupDirectory",
  "backupProtocol",
  "backupServer",
  "sysLogServerAddress",
  "sysLogServerPort",
  "sysLogServerProtocol",
  "sshEnabled",
  "networkIPv4Address",
  "networkIPv4Gateway",
  "networkIPv4NetMask",
  "networkIPv4Dns"
 ],
 "comparableNSXControllerConfig": [
  "networkIPv4Dns",
  "status"
 ],
 "comparableEsxiHostConfig": [
  "snmpEnabled",
  "ntpEnabled",
  "sshEnabled",
  "version"
 ]
}
```

FIG. 5

```
Raw JSON
{
 "VCenterConfig": {
  "version" : "1.0"
 },
 "NsxManagerConfig": {
  "version" : "1.0",
  "ntpServers" : "10.0.0.7",
  "backupDirectory" : "/user/backup",
  "backupProtocol" : "sftp",
  "backupServer" : "10.0.0.45",
  "sysLogServerAddress" : "10.0.0.8",
  "sysLogServerPort" : "514",
  "sysLogServerProtocol" : "UDP",
  "sshEnabled" : "true",
  "networkIPv4Address" : "10.0.0.4",
  "networkIPv4Gateway": "10.0.0.10",
  "networkIPv4NetMask" : "255.255.240.0",
  "networkIPv4Dns" : "10.0.0.20"
 },
 "NSXControllerConfig": {
  "networkIPv4Dns" : "10.0.0.20",
  "status" : "RUNNING"
 },
 "EsxiHostConfig": {
  "snmpEnabled" : "true",
  "ntpEnabled" : "true",
  "sshEnabled" : "true",
  "version" : "1.0"
 }
}
```

FIG. 6

```
Yaml
---
 comparableVCenterConfig:
  version: '1.0'
 comparableNsxManagerConfig:
  version: '1.0'
  ntpServers: 10.0.0.7
  backupDirectory: "/user/backup"
  backupProtocol: sftp
  backupServer: 10.0.0.45
  sysLogServerAddress: 10.0.0.8
  sysLogServerPort: '514'
  sysLogServerProtocol: UDP
  sshEnabled: 'true'
  networkIPv4Address: 10.0.0.4
  networkIPv4Gateway: 10.0.0.10
  networkIPv4NetMask: 255.255.240.0
  networkIPv4Dns: 10.0.0.20
 comparableNSXControllerConfig:
  networkIPv4Dns: 10.0.0.20
  status: RUNNING
 comparableEsxiHostConfig:
  snmpEnabled: 'true'
  ntpEnabled: 'true'
  sshEnabled: 'true'
  version: '1.0'
```

FIG. 7

METHODS AND APPARATUS TO DEPLOY SECURITY-COMPLIANT WORKLOAD DOMAINS

RELATED APPLICATION

This application claims the benefit of Foreign Application Serial No. 201941051305 filed in India entitled "METHODS AND APPARATUS TO DEPLOY SECURITY-COMPLIANT WORKLOAD DOMAINS", on Dec. 11, 2019, by VMWARE, Inc., which is herein incorporated in its entirety by reference for all purposes.

FIELD OF THE DISCLOSURE

This disclosure relates generally to computer systems, and, more particularly, to methods and apparatus to deploy security-compliant workload domains.

BACKGROUND

A software-defined data center (SDDC) is a data center implemented by software in which hardware is virtualized and provided to users as services. SDDCs allow for dynamically configuring and deploying applications and resources per customer requests and per customer-defined specifications and performance.

BRIEF DESCRIPTION OF THE DRAWINGS

FIG. 5 is an example representation of an input specification for a workload domain configuration.

FIG. 6 is an example Raw JavaScript Object Notation (JSON) file that represents a workload domain configuration before the normalization process of FIG. 4.

FIG. 7 is an example Yet Another Markup Language (Yaml) file that represents a workload domain configuration after the normalization process of FIG. 4.

The figures are not to scale. In general, the same reference numbers will be used throughout the drawing(s) and accompanying written description to refer to the same or like parts.

Figure 1:
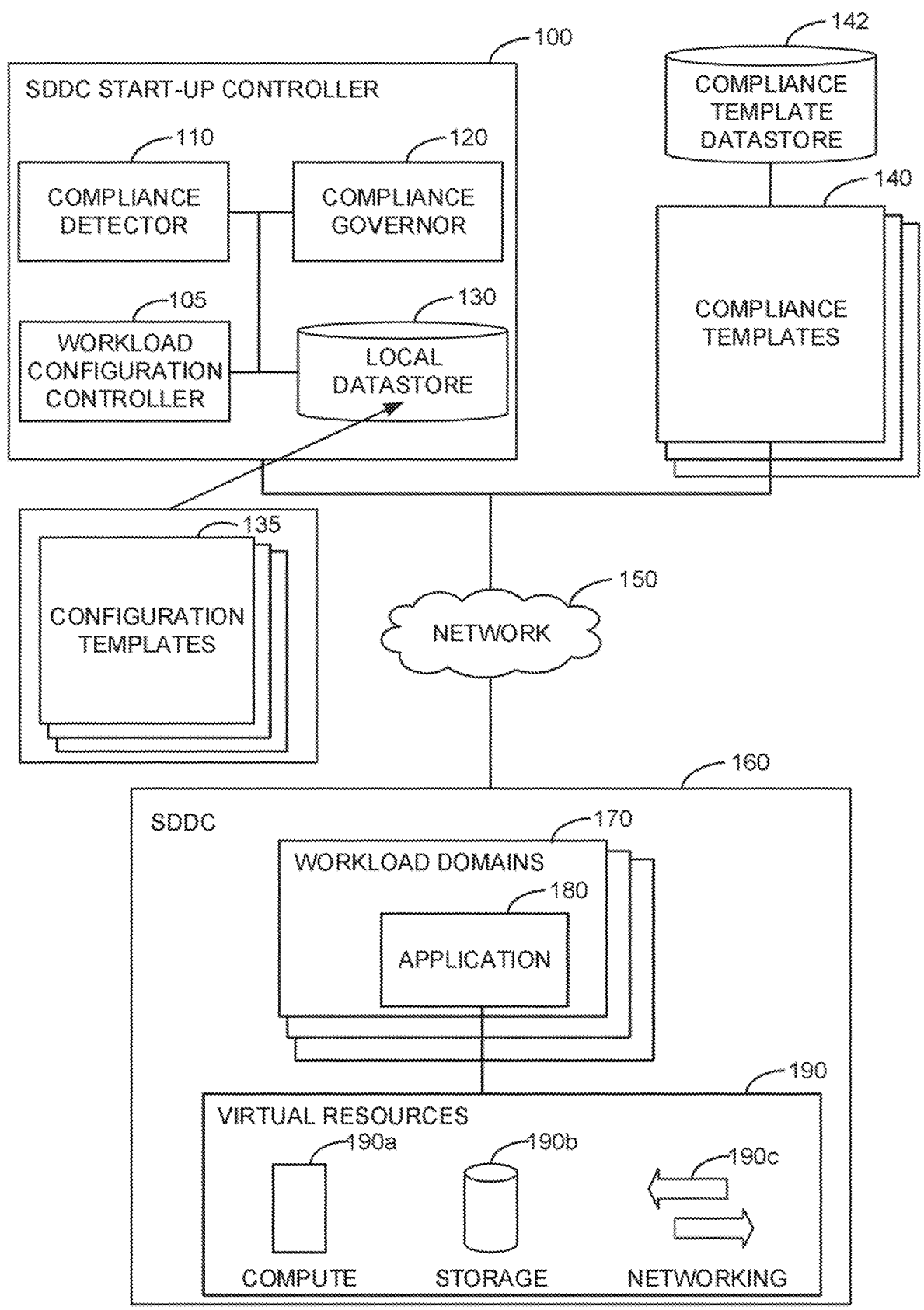
FIG. 1 is a schematic illustration of an example SDDC environment.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An SDDC environment typically requires configuration of compute resources, network resources, storage resources, and security protocols. Vulnerabilities can be present in the system if these configurations are not done properly. In examples disclosed herein, an SDDC executes workload domains in accordance with resource configurations corresponding to these workload domains. As used herein, a workload domain is a policy-based resource container with specific availability and performance attributes that combines virtual compute resources, virtual storage resources, and virtual network resources into a useable execution environment. In examples disclosed herein, a workload domain is deployed in a virtualization environment and used to execute deployed applications.

Workload domains can be configured to comply with one or more security protocols. In examples disclosed herein, a workload domain configuration is compared to a compliance template to determine if the workload domain is compliant with one or more industry standards for security. This comparison is used to calculate a non-compliance drift value, which represents the differences between the workload domain configuration and the compliance template. After the non-compliance drift value is found, the workload domain configuration is changed to match the configuration set forth by the compliance template. When the workload domain configuration is compliant with the compliance template, one or more applications can be deployed in the workload domain as specified by a customer or end user of the workload domain.

In prior techniques, security compliance of the workload domain is not determined until after the workload domain is already fully deployed and accessible by users for executing applications. This creates a security vulnerability in the workload domain. That is, the accessibility to deploy applications in the workload domain allows users, including malicious users, to access resources of the workload domain for many purposes, including malicious activity. As such, when a workload domain is not compliant with compliance template requirements for the security of the application before application deployment, the workload domain is vulnerable to malicious activity. Prior techniques address such vulnerabilities by checking compliance of a workload domain after the workload domain is accessible to execute applications. In prior techniques, such checking of compliance of a workload domain and making updates to bring the workload domain into compliance are performed manually by an administrator. However, checking and updating a workload domain for security compliance after it is accessible to execute applications leaves the workload domain vulnerable for an interim duration of user accessibility. In addition, changing a workload domain configuration for security compliance after entering a user accessibility state requires a reboot in order to apply the changes to any executing applications. This reboot requires extra time and resources for the system and requires re-starting of applications which can be burdensome on the user.

In examples disclosed herein, a workload domain is instantiated based on a workload domain configuration template that defines resource and security configurations for that workload domain. In examples disclosed herein, a workload domain configuration is compared to a compliance template before the workload domain is accessible for deploying applications. In examples disclosed herein, to automate compliance verification and updates to ensure compliance with security policies, compliance templates are provided to indicate security configuration settings for workload domains. In this manner, examples disclosed herein use machine-automated processes to compare workload domain configurations to compliance templates and/or update workload domain configurations when needed to satisfy security configuration settings in the compliance templates. In examples disclosed herein, a compliance template is the information source that specifies security configurations to be implemented in workload domains based on security requirements of applications to be executed in those workload domains. As such, a compliance template is used to determine a compliance or non-compliance of a workload domain. By determining any non-compliance of a workload domain and updating the workload domain to a compliance status configuration before applications are deployed, this substantially reduces or eliminates the likelihood of vulnerabilities to applications and also avoids rebooting (e.g., downtime) after deployment. In examples disclosed herein, non-compliant aspects of a workload domain can be detected and updated before the workload domain is accessible for application deployment. In this manner, the workload domain environment is not vulnerable during application deployments and does not require a downtime for reboots to implement compliance changes. Examples disclosed herein bring a workload domain into compliant status with industry standards earlier in a deployment process than prior techniques in a way that substantially reduces or eliminates durations of vulnerabilities created by prior techniques.

FIG. 1 is a schematic illustration of an example SDDC environment. The example SDDC environment of FIG. 1 includes an example SDDC start-up controller 100, example compliance templates 140, and an example SDDC 160. The example SDDC start-up controller 100 includes an example workload configuration controller 105, an example compliance detector 110, an example compliance governor 120, and an example local datastore 130. The example local datastore 130 includes example configuration templates 135 (e.g., workload domain configuration templates). The example SDDC 160 includes example workload domains 170, an example application 180, and example virtual resources 190. The example SDDC start-up controller 100 and the example SDDC 160 communicate via an example network 150.

The SDDC start-up controller 100 of the illustrated example of FIG. 1 configures resources and security protocols in the SDDC 160. For example, the SDDC start-up controller 100 configures and deploys the workload domains 170 based on the configuration templates 135. The SDDC start-up controller 100 also determines whether the configurations of the workload domains 170 in the SDDC 160 are compliant with security protocols specified for the application 180 to run in the workload domain 170. In examples disclosed herein, compliance templates are provided to facilitate a machine-automated process for determining compliance of workload domain configuration settings. For example, the SDDC start-up controller 100 uses the compliance templates 140 to determine the security configuration settings specified (e.g., by a customer or end user) for the application 180 and compares the compliance templates 140 to the configuration templates 135 to determine compliance. The example SDDC start-up controller 100 is also provided to make changes to the configuration of the workload domains 170 when it is determined that the current configuration is not compliant with the security configuration settings found in the compliance templates 140. The compliance templates 140 may be stored in a repository (e.g., a compliance template datastore 142) and added by users or customers to specify security configuration settings for use with running different applications. The example compliance template datastore 142 may be implemented in network attached storage that is accessible via the network 150.

The configuration templates 135 of the illustrated example of FIG. 1 provide configuration settings for the workload domains 170. As used herein, a configuration template 135 is a data file that stores general configuration settings for workload domains 170. In examples disclosed herein, the configuration templates 135 are used by the SDDC start-up controller 100 to initially configure the workload domains 170. Multiple configuration templates with different settings may be provided for different workload domains 170 such as, for example, a workload domain for using a banking application, a workload domain for using a streaming service application, etc. In examples disclosed herein, the configuration templates 135 may be outdated or may be incomplete and/or inconsistent with security provisions for particular applications. As such, instead of changing or creating a new "configuration template" when customers or users specify new or different security settings for different applications, the example compliance templates 140 can be used to update security configuration settings of workload domains dynamically. In the illustrated example of FIG. 1, three configuration templates 135 are shown. However, any number of configuration templates 135 may additionally or alternatively be stored for use. The example configuration templates 135 are implemented as data structures to store security configuration settings. The example configuration templates 135 can be stored as any data file, such as, for example, a JSON file, a text file, or any other data file type.

The SDDC 160 of the illustrated example of FIG. 1 represents an SDDC instantiated and configured by the SDDC start-up controller 100. The example SDDC 160 is provided to virtualize the network resources and storage resources allocated for workload domains and/or applications. In examples disclosed herein, the SDDC 160 provides the resources for the workload domains 170 and the application 180.

The workload domains 170 of the illustrated example of FIG. 1 run in accordance with workload domain configuration settings to enforce security policies and provide resource access to applications, such as an application 180, to be used by end users or customers. For example, the workload domains 170 are configured with resources and security protocols specified for the application 180 to run properly and/or in a secure manner. The configurations of the example workload domains 170 are completed by the SDDC startup controller 100. In the illustrated example of FIG. 1, three workload domains 170 are shown. However, any number of workload domains 170 may additionally or alternatively be implemented for use.

The application 180 of the illustrated example of FIG. 1 is provided to perform functions requested by a user. In examples disclosed herein, these functions could be, for example, a web server, a banking database, a media streaming server, etc. In some examples, the application 180 may include plugins (e.g. the plugins 360 of FIG. 3) to provide interfaces to resources, such as, for example, a vSphere plugin (e.g., the example vSphere plugin 360*a* of FIG. 3) to provide access to virtualized compute resources (e.g., virtualized controller processing units (CPUs), virtualized graphics processing units (GPUs), virtualized memory, etc.), an NSX plugin (e.g., the example NSX plugin 360*c* of FIG. 3) to provide access to virtualized network resources, and/or a vSAN plugin (e.g., the example vSAN plugin 360*b* of FIG. 3) to provide access to virtualized storage resources. The example plugins allow for the example application 180 to have access to the virtual resources 190 when performing the functions requested by the user. Example plugins are described in more detail below in connection with FIG. 3. The example application 180 is implemented by a processor executing computer executable instructions such as, for example, JavaScript. However, any other type of computer executable instructions may additionally or alternatively be used such as, for example, Java, C, C++, etc.

The virtual resources 190 of the illustrated example of FIG. 1 are provided to perform the functions of physical resources for the workload domains 170. In examples disclosed herein, the virtual resources 190 include a virtualized compute resource 190*a*, a virtualized storage resource 190*b*, and a virtualized networking resource 190*c*. However, any other virtual resources may additionally or alternatively be used. The example virtual resources 190 are accessed and configured by the plugins. The example plugins and how they access the virtual resources 190 are described in more detail below in connection with FIG. 3.

The compliance templates 140 of the illustrated example of FIG. 1 provide compliance configuration settings for comparing with the workload domain configurations. As used herein, a compliance template 140 is a data file that stores configuration settings to confirm security compliance of the workload domains 170 and/or to bring the workload domain 170 into compliance with security requirements of applications to be executed in the workload domains 170. In examples disclosed herein, different workload domains 170 are provided different configuration settings depending on the application 180 that is being executed. In examples disclosed herein, the compliance templates 140 are used by the SDDC start-up controller 100 to configure the workload domains 170 to be compliant with security configuration settings specified by a user or customer of the application 180. Multiple compliance templates 140 may be provided for different applications such as a banking application, a web server application, a media streaming service application, etc. In the illustrated example of FIG. 1, three compliance templates 140 are shown. However, any number of compliance templates 140 may additionally or alternatively be stored for use. The example compliance templates 140 are implemented as data structures, which include information that represents security configuration settings for different workload domains 170 in the SDDC 160. The example compliance templates 140 can be stored as any data file, such as, for example, a JSON file, a text file, or any other data file type.

The example SDDC start-up controller 100 includes an example compliance detector 110, an example compliance governor 120, and an example local datastore 130. The workload configuration controller 105 of the illustrated example of FIG. 1 is provided to retrieve configuration templates 135 from the local datastore 130 and configure the workload domains 170 based on settings of the retrieved configuration templates 135. The example workload configuration controller 105 selects a configuration template 135 based on a type (e.g., banking, web server, media streaming, etc.) of the application 180 that will be deployed in the workload domain 170.

The compliance detector 110 of the illustrated example of FIG. 1 determines a non-compliance drift by comparing workload domain configuration settings of the workload domains 170 to corresponding compliance configuration settings of the compliance templates 140. The example compliance detector 110 selects a compliance template 140 for comparing with a workload domain configuration based on a particular application 180 executing in the workload domain 170. That is, ones of the compliance templates 140 can include different security requirements for different applications 180 of the same type (e.g., banking, web server, media streaming, etc.) and or of different types. For example, for a banking application of Customer A that accesses a Customer A banking database, a specific compliance template with the required security protocols for accessing that Customer A banking database is chosen and may differ from security protocols of a Customer B banking application that accesses a customer B banking database. Thus, an example configuration template 135 includes general settings for a workload domain to execute a banking type of application, and a compliance template 140 includes updated and/or more specific security settings corresponding to a particular banking application. The example compliance detector 110 determines which configuration settings in the workload domains 170 are not compliant with the configuration settings in the compliance templates 140. The example compliance detector 110 provides non-compliance output information that represents non-compliance drift between a workload domain and a compliance template 140, as described below in connection with FIG. 4. In examples disclosed herein, the non-compliance output information indicates which configuration settings in the workload domains 170 need to be changed to the configuration settings in the compliance templates 140. Such indications may be through special characters, highlighting, flags, etc.

The compliance governor 120 of the illustrated example of FIG. 1 is provided to update configuration settings of the workload domains 170. The example compliance governor 120 changes the configuration settings of the workload domains 170 to the configuration settings of the compliance templates 140 based on the non-compliance drift found by the compliance detector 110. The example compliance governor 120 is provided to verify whether the changed configuration of the workload domains 170 are compliant with the configuration settings in the compliance templates 140. The example compliance governor 120 is also provided to manage plugins used by applications. For example, after the compliance governor 120 determines that the configuration settings of a workload domains 170 are compliant with a selected compliance template 140, the compliance governor 120 determines if any plugins are needed by the application 180 in the newly configured workload domain 170. The plugins allow the application 180 to access resources to implement different functionalities, as described below in connection with FIG. 3.

The local datastore 130 of the illustrated example of FIG. 1 stores configuration templates 135 to configure workload domains 170 in the SDDC 160. However, other data may additionally and/or alternatively be stored by the local datastore 130. The local datastore 130 of the illustrated example of FIG. 1 is implemented by any memory, storage device, and/or storage disc for storing data such as, for example, flash memory, magnetic media, optical media, solid state memory, hard drive(s), thumb drive(s), etc. Furthermore, the data stored in the example local datastore 130 may be in any data format such as, for example, binary data, comma delimited data, tab delimitated data, structured query language (SQL) structures, etc. While, in the illustrated example of FIG. 1, the local datastore 130 is illustrated as a single device, the local datastore 130 and/or any other data storage devices described herein may be implemented by any number and/or type(s) of storage devices.

The example SDDC startup controller 100, the example SDDC 160, and the example compliance templates 140 are accessible via the example network 150. The network 150 of the illustrated example of FIG. 1 is implemented as a local area network (LAN). However, any other type of network may additionally and/or alternatively be used such as, for example, a wide area network (WAN), a wireless local area network (WLAN), a storage area network (SAN), etc.

Figure 2:
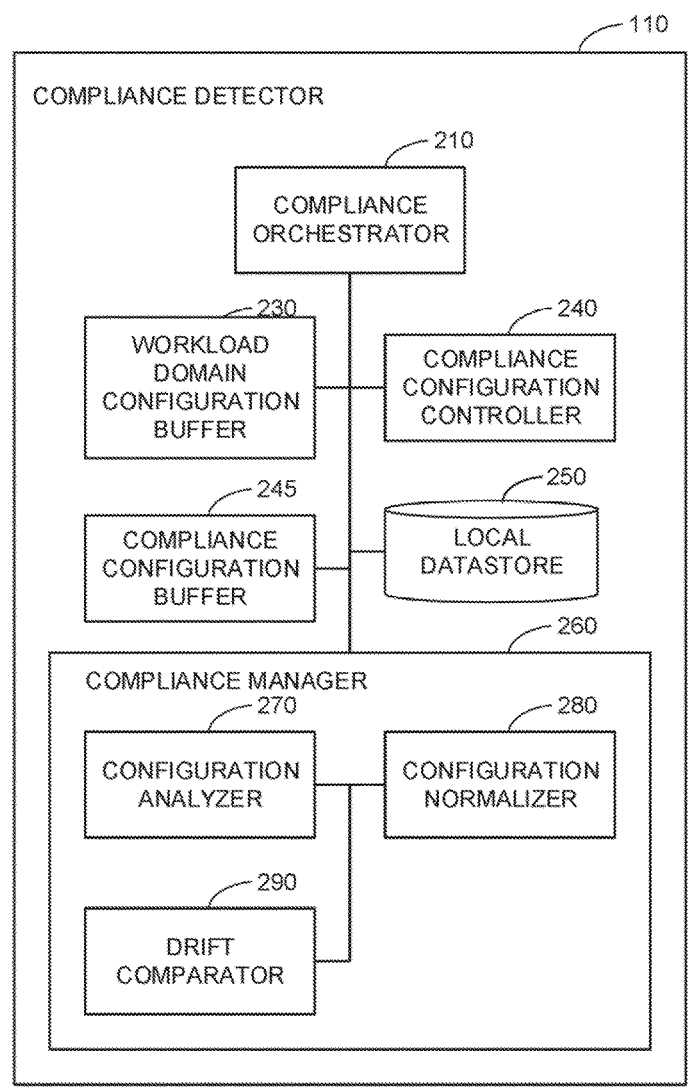
FIG. 2 is a block diagram representative of an example compliance detector of the example SDDC environment of FIG. 1.

FIG. 2 is a block diagram representative of the example compliance detector 110 of the example SDDC environment of FIG. 1. The compliance detector 110 of FIG. 2 includes an example compliance orchestrator 210, an example workload domain configuration buffer 230, an example compliance configuration controller 240, an example compliance configuration buffer 245, an example local datastore 250, and an example compliance manager 260. The example compliance manager 260 includes an example configuration analyzer 270, an example configuration normalizer 280, and an example drift comparator 290.

The compliance orchestrator 210 of the illustrated example of FIG. 2 is provided to operate as a system controller for the compliance detector 110. The example compliance orchestrator 210 communicates with the compliance configuration controller 240 when one of the compliance templates 140 (FIG. 1) is to be chosen for a workload domain. Compliance configuration settings from a selected one of the compliance templates 140 are stored in the example compliance configuration buffer 245. For example, the example compliance configuration controller 240 copies the settings of the selected compliance template 140 into the compliance configuration buffer 245 to be used locally in the compliance detector 110. The example compliance configuration controller 240 is also provided to select one of the compliance templates 140 for the workload domain 170 (FIG. 1) being configured. For example, the compliance configuration controller 240 selects a compliance template 140 based on the application or applications 180 (FIG. 1) to be deployed in the workload domain 170. The application or applications 180 to be deployed may need specific security protocols specified in the selected compliance template 140. For example, a look-up table may be used to associate applications 180 with corresponding ones of the compliance templates 140. In this manner, the compliance configuration controller 240 may use the look-up table to select ones of the compliance templates 140 for different applications 180. Alternatively, the compliance templates 140 may store names and/or other identifiers of applications 180 to which they correspond. In this manner, the compliance configuration controller 240 may base its selection of ones of the compliance templates 140 based on those application names and/or identifiers. In other examples, the compliance configuration controller 240 may employ any other suitable manner of selecting the compliance templates 140.

The example compliance configuration buffer 245 of the illustrated example of FIG. 2 stores compliance configuration settings of a selected one of the compliance templates 140. In examples disclosed herein, when the workload domain 170 is to execute an application 180 requiring particular security protocols (e.g., based on the functions to be performed by the application 180), the compliance configuration settings in the compliance configuration buffer 245 can be used by the compliance manager 260 to determine those required security protocols. For example, if the function of the application 180 is a media streaming server, the application 180 may use security protocols to protect against attacks or malicious activity that could compromise the media. These security protocols would be different for an application 180 that accesses a banking database. In such example, the banking application is associated with a different compliance template 140 storing different security protocol requirements from the media streaming server. The example compliance configuration buffer 245 is a data file that stores the security configuration settings to be used by an application 180 under analysis for deployment in a workload domain 170. The example compliance configuration buffer 245 can be implemented as any data file such as, for example, a JSON file, a text file, or any other data file type.

The workload domain configuration buffer 230 of the illustrated example of FIG. 2 stores the workload domain configuration settings of a workload domain 170 that is under analysis for compliance with security protocols in a compliance configuration buffer 245. In examples disclosed herein, the workload domain configuration buffer 230 is implemented as a data structure in a data file. The example workload domain configuration buffer 230 can be implemented as any data file such as, for example, a JSON file, a text file, or any other data file type.

The compliance manager 260 of the illustrated example of FIG. 2 is provided to normalize the workload domain configuration settings in the workload domain configuration buffer 230 as well as to determine a non-compliance drift value by comparing workload domain configuration settings in the workload domain configuration buffer 230 to the selected compliance configuration settings in the compliance configuration buffer 245. The configuration analyzer 270 of the illustrated example of FIG. 2 is provided to access the workload domain configuration from the workload domain configuration buffer 230 and to access compliance configuration settings in the compliance configuration buffer 245. The example configuration analyzer 270 provides the workload domain configuration settings to the configuration normalizer 280 and provides the compliance configuration settings to the drift comparator 290 for processing as discussed below.

The configuration normalizer 280 of the illustrated example of FIG. 2 is provided to normalize the workload domain configuration settings in the workload domain configuration buffer 230 to be in a same or substantially similar format as the selected compliance template 140 represented in the compliance configuration buffer 245. In examples disclosed herein, the normalization process involves changing the format of a data file or data structure that includes the workload domain configuration setting to the format of a data file or data structure that includes the compliance configuration settings selected from the compliance templates 140. The normalization process is described in further detail below in connection with FIG. 4. The example configuration normalizer 280 provides a normalized workload domain configuration (e.g., the normalized workload domain configuration 420 of FIG. 4) to represent the workload domain configuration settings in the workload domain configuration buffer 230 so that the drift comparator 290 can compare the normalized workload domain configuration to the compliance configuration buffer 245.

The drift comparator 290 of the illustrated example of FIG. 2 accesses the normalized workload domain configuration (e.g., the normalized workload domain configuration 420 of FIG. 4) provided by the configuration normalizer 280 and accesses the compliance configuration buffer 245. The example drift comparator 290 compares the normalized workload domain configuration settings to the selected compliance configuration settings. For example, the drift comparator 290 compares ones of the elements in the normalized workload domain configuration to corresponding one of the elements in the selected compliance configuration to determine which configuration settings differ from one another. The example drift comparator 290 calculates a non-compliance drift value based on the comparison between the elements of the normalized workload domain configuration and the selected compliance configuration. As used herein, the non-compliance drift value calculated by the drift comparator 290 is an indication of a difference between the normalized workload domain configuration and the selected compliance template 140. In some examples, the non-compliance drift value may be binary in that a binary flag (e.g., 1 or 0, yes or no, etc.) indicates the presence of any difference(s) or no difference at all. Additionally or alternatively, the non-compliance drift value can quantify a number of differences and/or a degree of difference(s) found. For example, the non-compliance drift value may be a score indicative of how many mismatches were found and/or how much settings differed (e.g., numeric differences between version numbers). In some examples, details and/or identifications of indications may be through special characters, highlighting, flags, etc. pointing out the specific configuration settings determined to be different. The drift comparison process is described in further detail below in connection with FIG. 4. The output of the example drift comparator 290 is stored in the local datastore 250 for later use in updating the workload domain configuration settings in the workload domain configuration buffer 230, as discussed below in connection with FIG. 3.

Figure 3:
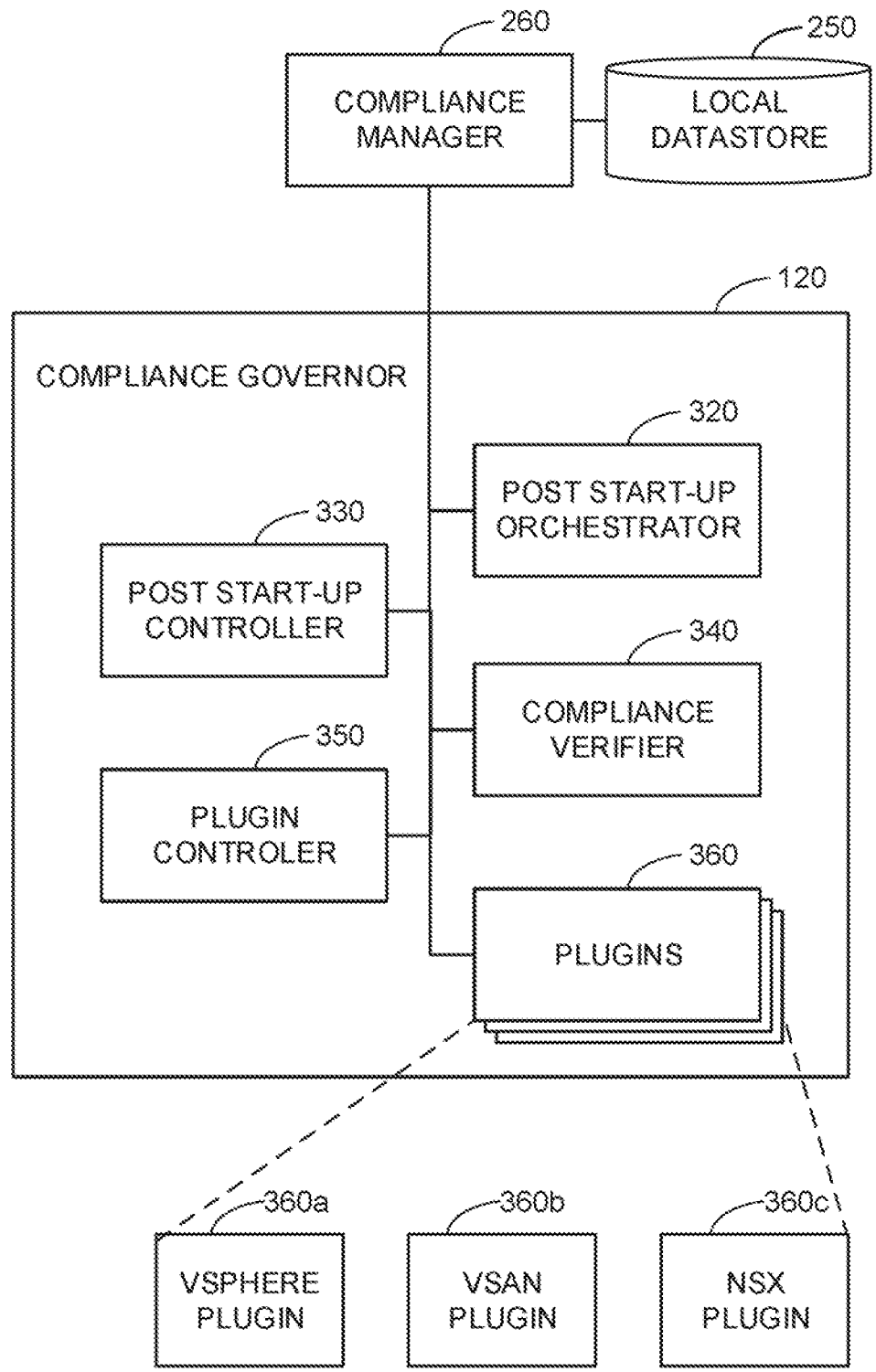
FIG. 3 is a block diagram representative of an example compliance governor of the example SDDC environment of FIG. 1.

FIG. 3 is a block diagram representative of the example compliance governor 120 of the example SDDC environment of FIG. 1. The compliance governor 120 of the example of FIG. 3 includes an example post start-up orchestrator 320, an example post start-up controller 330, an example compliance verifier 340, an example plugin controller 350, and example plugins 360. In examples disclosed herein, of the compliance governor 120 is in circuit with the compliance manager 260 of the compliance detector 110 (FIG. 2). The example compliance manager 260 provides access to the local datastore 250 to retrieve the non-compliance drift value that indicates any differences between the compliance configuration settings in the compliance configuration buffer 245 (FIG. 2) and the workload domain configuration settings in the workload domain configuration buffer 230 (FIG. 2).

The post start-up orchestrator 320 of the illustrated example of FIG. 3 is provided to manage communication of information between the compliance manager 260 (FIG. 2), the post start-up controller 330, the compliance verifier 340, and the plugin controller 350.

The post start-up controller 330 of the illustrated example of FIG. 3 receives the output non-compliance drift value from the compliance manager 260 (FIG. 2) (e.g., through the post start-up orchestrator 320). The example post start-up controller 330 is provided to implement changes in the workload domain configuration settings based on the non-compliance drift value. As described above in connection with FIG. 2, the non-compliance drift value can be generated in association with non-compliance indicators such as, for example, special characters, highlighting, flags, etc. that indicate configuration settings determined to be different between the workload domain configuration settings and the compliance configuration settings. The example post start-up controller 330 detects or recognizes the non-compliance indicators and changes or updates corresponding configuration settings associated with the non-compliance indicators in the workload domain configuration to the corresponding settings in the compliance configuration settings. The example post start-up controller 330 provides updated workload domain configuration settings compliant with compliance configuration settings.

The compliance verifier 340 of the illustrated example of FIG. 3 accesses the updated workload domain configuration settings provided by the post start-up controller 330 (e.g., through the post start-up orchestrator 320). The example compliance verifier 340 is provided to check that the updated workload domain configuration settings are compliant with the compliance configuration settings in the compliance configuration buffer 245 (FIG. 2). The example compliance verifier 340 serves as a checker to determine whether the post start-up controller 330 updated settings correctly in the workload domain configuration settings. The example compliance verifier 340 provides a compliance indicator value to the post start-up orchestrator 320 to indicate whether the workload domain configuration settings are compliant with the compliance configuration settings.

The plugin controller 350 of the illustrated example of FIG. 3 is provided to determine which plugins 360 are to be assigned to the application 180 being deployed in the workload domain 170 of the example of FIG. 1. The example plugin controller 350 is notified by the post start-up orchestrator 320 when the workload domain configuration settings comply with the compliance configuration settings. Once the workload domain configuration settings are verified as compliant, the example plugin controller 350 deploys ones of the plugins 360 for use by the application 180 in the workload domain 170. The example plugins 360 provide interfaces to resources. Example plugins that may be used to implement the plugins 360 include an example vSphere plugin 360a, an example vSAN plugin 360b, and an example NSX plugin 360c. These example plugins 360 provide the application 180 with access to the virtual resources 190 (FIG. 1). For example, the vSphere plugin 360a provides access to the virtualized compute resources 190a, the vSAN plugin 360b provides access to the virtualized storage resources 190*b*, and the NSX plugin 360*c* provides access to the virtualized network resources 190*c*. However, any other plugins may additionally or alternatively be used.

In examples disclosed herein, some of the workload domain configuration settings may be representative of settings in the virtualized resources 190 (FIG. 1) assigned to the workload domain 170. The example virtual resources 190 contain settings for the virtualized compute resources, the virtualized storage resources, and the virtualized network resources. The configuration settings corresponding to the virtual resources 190 are updated by the post-startup controller 330 to match the settings of the updated workload domain configuration settings of the workload domain 170. When the post start-up controller 330 modifies ones of the workload domain configuration settings, corresponding ones of the example plugins 360 update corresponding configuration settings in the corresponding virtual resources 190. For example, the vSphere plugin 360*a* changes settings in the virtualized compute resources 190*a*, the vSAN plugin 360*b* changes settings in the virtualized storage resources 190*b*, and the NSX plugin 360*c* changes settings in the virtualized network resources 190*c*.

Figure 4:
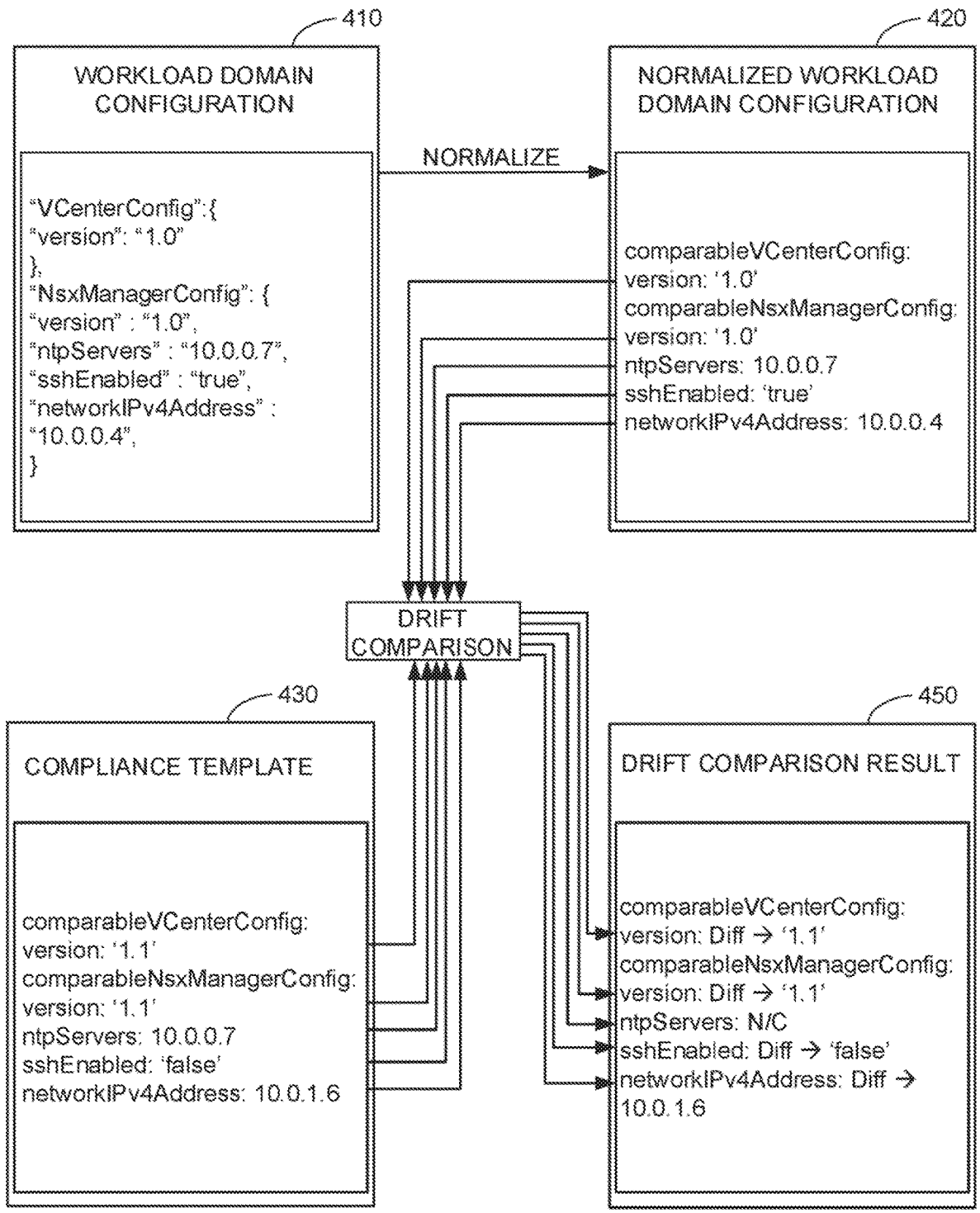
FIG. 4 depicts example normalization and drift comparison processes between a workload domain configuration and a compliance template.

FIG. 4 depicts example normalization and drift comparison processes. FIG. 4 includes an example workload domain configuration 410, an example normalized workload domain configuration 420, an example compliance template 430, and an example drift comparison result 450.

The drift comparison process of the example of FIG. 4 is a character-level comparison in which character-by-character comparisons are performed between two configuration settings. To substantially reduce or eliminate the likelihood of false mismatches between the settings of the workload domain configuration 410 and the compliance template 430 at the character level, a character-level normalization of the workload domain configuration 410 is performed to convert the text of the workload domain configuration 410 into a format that aligns with the text of the compliance template 430.

To perform such character-level normalization, the example configuration normalizer 280 (FIG. 2) uses the formatting of labels and values for settings in the compliance template 430 as a references or target for how to perform character-level modifications of text for corresponding labels and values of settings in the workload domain configuration 410. The example configuration normalizer 280 performs the normalization of the workload domain configuration 410 to generate the normalized workload domain configuration 420 without substantively changing the meanings or values of the settings represented in the workload domain configuration 410.

The example normalization process of FIG. 4 uses the example workload domain configuration 410 to generate the example normalized workload domain configuration 420. The example workload domain configuration 410 represents an original format of the workload domain configuration settings from the configuration templates 135 stored in the local datastore 130 of the example of FIG. 1. In the example of FIG. 4, only some configuration settings are shown. In other examples, other configuration settings may additionally or alternatively be included in the workload domain configuration 410. The original format of the workload domain configuration 410 of FIG. 4 includes curly braces and double quotation marks to specify workload domain configuration settings such as, for example, version number, network address, etc. The example configuration normalizer 280 (FIG. 2) normalizes the workload domain configuration 410 by at least removing some of the double quotation marks, replacing some double quotation marks with single quotation marks, and removing commas. Also in the illustrated example, the configuration normalizer 280 prepends prefix text of "comparable" to make the label "VCenterConfig" of the workload domain configuration 410 match the corresponding label "comparableVCenterConfig" of the compliance template 430. In other examples, other text may be prepended, appended, and/or removed from labels or other keyworks in the workload domain configuration 410 to match corresponding labels or keywords in the compliance template 430. These are merely some examples of how the configuration normalizer 280 can modify the workload domain configuration 410 to generate the normalized workload domain configuration 420. In other examples, the configuration normalizer 280 can additionally or alternatively use other types of modifications. After such modifications, FIG. 4 shows that the format of the settings in the normalized workload domain configuration 420 have changed, but the values associated with those settings have not changed (e.g., have remained the same) relative to the workload domain configuration 410. This represents how the normalization process reformats the workload domain configuration 410 to be similar to or the same as the format of the compliance template 430 to facilitate an accurate comparison with the compliance template 430.

After the normalization process, the normalized workload domain configuration 420 is in a format that is compatible for comparison with the format of the compliance template 430. As such, the example drift comparison process of FIG. 4 uses the example normalized workload domain configuration 420 and the compliance template 430 to generate the example drift comparison results 450.

During the drift comparison, values of settings in the normalized workload domain configuration 420 are compared to corresponding settings values in the compliance template 430 using character-level comparisons. For example, the version setting in the normalized workload domain configuration 420 is compared to the version setting in the compliance template 430. If the comparison of the version settings values result in a mismatch (e.g., the version setting value in the normalized workload domain configuration 420 is not the same as the version setting value in the compliance template 430), the version setting is marked as non-compliant in the drift comparison result 450. In the example of FIG. 4, the non-compliance marking is represented using an example mismatch text label of "Diff" As used herein, a mismatch text label is used to indicate when the setting value in the normalized workload domain configuration 420 does not match the corresponding setting value in the compliance template 430 based on a character-level comparison. However, in other examples this marking might additionally or alternatively be highlighting, a special character, etc.

In the example of FIG. 4, the drift comparison result 450 also indicates target values to which settings should be changed when a mismatch text label (e.g., "Diff") is inserted. An example of this can be seen with the version setting. The version is set as 1.0 in the normalized workload domain configuration 420, and the version is set as 1.1 in the compliance template 430. After the drift comparison of the version setting, the version is flagged as "Diff" in the drift comparison result 450, and the target value 1.1 is indicated in the drift comparison result 450 as the change needed for that setting in the workload domain configuration 410.

However, in other examples the target value may not be inserted or may be indicated in a different way than shown in the example of FIG. 4.

Also in the example drift comparison process of FIG. 4, if it is found that the corresponding settings in the normalized workload domain configuration 420 and the compliance template 430 are the same, then the setting in the drift comparison result is indicated with a no-change text label "N/C." However, in other examples the no-change text label may be omitted, and no other indicator may be provided for matching settings. In such examples, omitting labels or other special match indicators is to indicate those settings as matched. An example of the no-change text label "N/C" is shown in connection with the ntpServers setting. Overall, the example drift comparison result 450 is used to change or not change settings of the workload domain configuration to be compliant with security configuration settings for an application.

FIG. 5 is an example representation of an input specification 500 for a normalized workload domain configuration format that may be used to implement the normalized workload domain configuration 420 (FIG. 4) in a same format as the compliance templates 140. The example input specification 500 is stored in a local datastore (e.g., the local datastore 250 of FIG. 2) and accessed by the configuration normalizer 280 (FIG. 2) when a workload domain configuration is being normalized. As shown in FIG. 5, the example input specification 500 contains the general format and the list of settings labels for the normalized workload domain configuration. However, the input specification 500 does not contain any values associated with the listed settings labels. The input specification 500 serves as a blank template for the normalized workload domain configuration to follow when arranging the settings with corresponding values in the normalized workload domain configuration. In some examples, when a setting is omitted or not set in a workload domain configuration, that setting placeholder represented in the input specification 500 can be omitted from a normalized workload domain configuration. For example, the example input specification 500 includes a "buildNumber" but the normalized workload domain configuration shown in the Yet Another Markup Language (YAML) file 700 in FIG. 7 does not contain the "buildNumber" setting. The YAML file 700 does not include the "buildNumber" setting because the workload domain configuration settings in the Raw JavaScript Object Notation (JSON) file 600 in FIG. 6 do not include the "buildNumber" setting. As such, during the drift comparison process discussed above in connection with FIG. 4, if the compliance template 430 includes a value for the "buildNumber" setting and the normalized workload domain configuration shown in the YAML file 700 does not contain the "buildNumber" setting, the drift comparison results 450 note the "buildNumber" setting with a mismatch text label.

FIG. 6 is an example Raw JavaScript Object Notation (JSON) file 600 that represents a workload domain configuration (e.g., similar to the workload domain configuration 410 of FIG. 4) with configuration values before the normalization process of FIG. 4. The workload configuration controller 105 (FIG. 1) accesses the settings values from configuration templates 135 (FIG. 1) stored in the local datastore 130 (FIG. 1) to fill in the values for the settings in the workload domain configuration shown in the Raw JSON file 600. The configuration template 135 in the local datastore 130 is selected based on the application 180 (FIG. 1) being deployed in the workload domain 170 (FIG. 1). Once the configuration template 135 is selected, the settings are input into the workload domain configuration shown in the Raw JSON file 600. The example Raw JSON file 600 arranges the configuration settings of the workload domain 170 based on the format received from the local datastore 130.

FIG. 7 is an example Yet Another Markup Language (Yaml) file 700 that represents a normalized workload domain configuration generated by the normalization process of the example of FIG. 4. For example, the normalized workload domain configuration 420 of FIG. 4 may be stored using a Yaml file structurally similar to the Yaml file 700 of FIG. 7. Although the example Yaml file 700 is formatted differently than the Raw JSON file 600, the values for the settings remain the same. The example Yaml file 700 represents an example normalized workload domain configuration format that is used for comparing configuration settings with the compliance templates 140 when determining the non-compliance drift discussed in connection with FIGS. 2 and 4.

While an example manner of implementing the SDDC start-up controller 100 of FIG. 1 is illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example workload configuration controller 105, the example compliance detector 110, the example compliance governor 120, the example local datastore 130, the example compliance orchestrator 210, the example workload domain configuration buffer 230, the example compliance configuration controller 240, the example compliance configuration buffer 245, the example local datastore 250, the example compliance manager 260, the example configuration analyzer 270, the example configuration normalizer 280, the example drift comparator 290, the example post start-up orchestrator 320, the example post start-up controller 330, the example compliance verifier 340, the example plugin controller 350, the example plugins 360 and/or, more generally, the example SDDC start-up controller 100 of FIG. 1 may be implemented by hardware, software, firmware and/or any combination of hardware, software and/or firmware. Thus, for example, any of the example workload configuration controller 105, the example compliance detector 110, the example compliance governor 120, the example local datastore 130, the example compliance orchestrator 210, the example workload domain configuration buffer 230, the example compliance configuration controller 240, the example compliance configuration buffer 245, the example local datastore 250, the example compliance manager 260, the example configuration analyzer 270, the example configuration normalizer 280, the example drift comparator 290, the example post start-up orchestrator 320, the example post start-up controller 330, the example compliance verifier 340, the example plugin controller 350, the example plugins 360 and/or, more generally, the example SDDC start-up controller 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload configuration controller 105, the example compliance detector 110, the example compliance governor 120, the example local datastore 130, the example compliance orchestrator 210, the example workload domain configuration buffer 230, the example compliance configuration controller 240, the example compliance configuration buffer 245, the example local datastore 250, the example compliance manager 260, the example configuration analyzer 270, the example configuration normalizer 280, the example drift comparator 290, the example post start-up orchestrator 320, the example post start-up controller 330, the example compliance verifier 340, the example plugin controller 350, the example plugins 360 is/are hereby expressly defined to include a non-transitory computer readable storage device or storage disk such as a memory, a digital versatile disk (DVD), a compact disk (CD), a Blu-ray disk, etc. including the software and/or firmware. Further still, the example SDDC start-up controller 100 of FIG. 1 may include one or more elements, processes and/or devices in addition to, or instead of, those illustrated in FIGS. 1, 2, and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, the configuration normalizer 280 implements means for generating normalized workload domain configuration settings. The example drift comparator 290 implements means for comparing the normalized workload domain configuration settings with the compliance configuration settings. In some example, the drift comparator 290 implements means for generating a label to indicate a mismatch. In examples disclosed herein, the post start-up controller 330 implements means for generating updated workload domain configuration settings. In some examples, the compliance verifier 340 implements means for determining whether the updated workload domain configuration settings satisfy the compliance configuration settings. In some examples, the compliance verifier 340 implements means for generating an exception.

Figure 8:
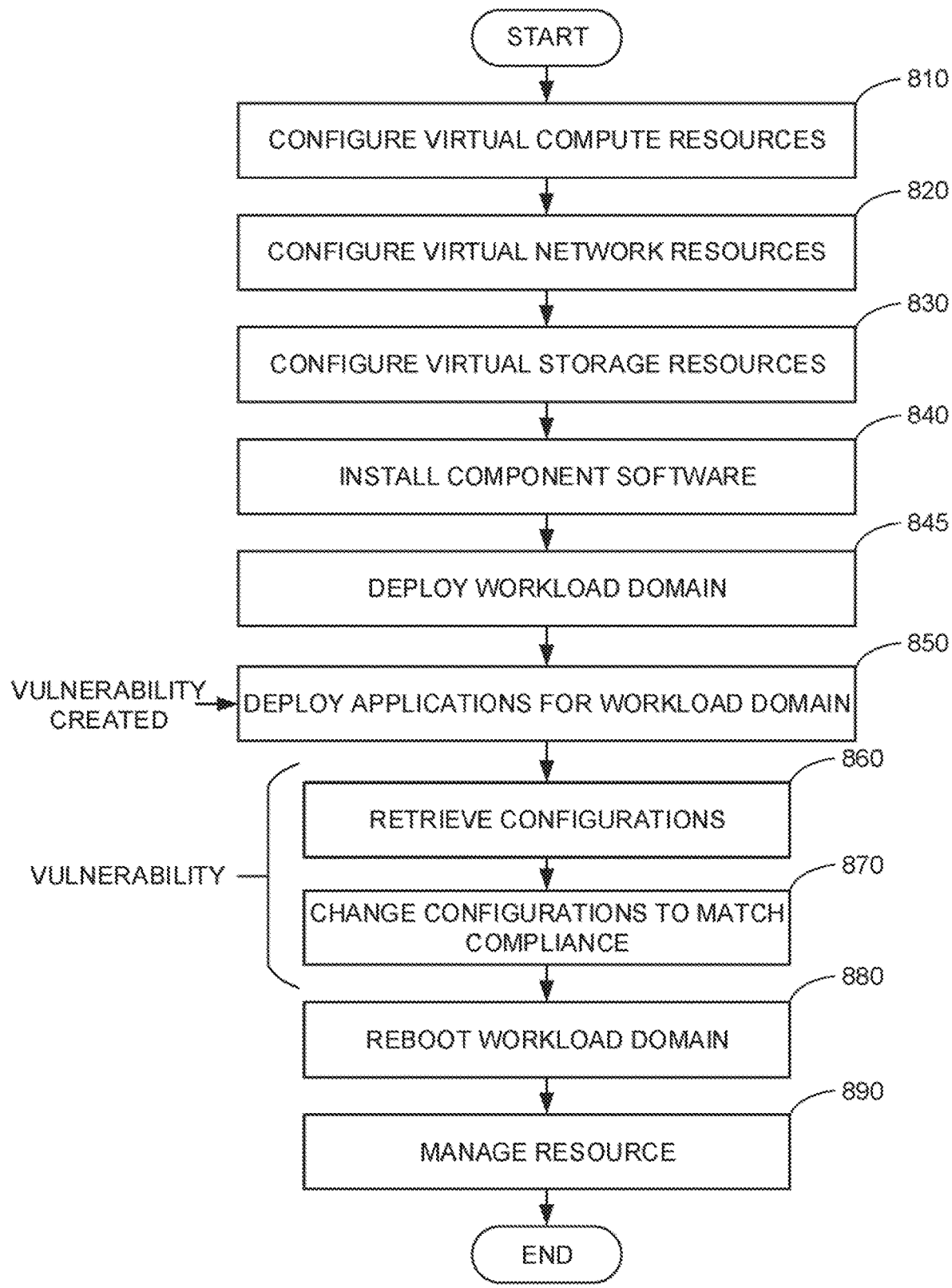
FIG. 8 is a flowchart representative of a prior process for deploying a workload domain which creates a vulnerability in the workload domain.

FIG. 8 is a flowchart representative a prior process for deploying a workload domain which creates a vulnerability in the workload domain. The example of FIG. 8 begins at block 810 at which the prior process configures virtual compute resources. At block 820, the prior process configures virtual network resources. At block 830, the prior process configures virtual storage resources. The prior process configures the virtual compute resources, the virtual network resources, and the virtual storage resources based on workload domain configuration settings.

At block 840, the prior process installs component software (e.g., ESXi software). The prior process installs the ESXi software before an application is deployed. At block 845, the prior process deploys the workload domain.

At block 850, the prior process deploys an application for the workload domain. After the application is deployed at block 850, the user/client is able to use the application to perform desired functions. As shown in FIG. 8, the prior process creates a vulnerability at block 850 by deploying an application for user-level access before confirming whether the workload domain is compliant with specified security configuration settings. The vulnerability of the workload domain remains active during operations of blocks 860 and 870 at which the prior process attempts to bring the workload domain into compliance with security configuration settings. The workload domain configuration settings are not updated with necessary security protocols until block 870, which leaves the process vulnerable to malicious activity until after block 870.

At block 860, the prior process retrieves configurations for the workload domain and for a compliance template. The prior process compares the current configuration settings for the deployed workload domain with compliance configuration settings.

The prior process changes the workload domain configuration settings to match the compliance template configuration settings. (Block 870).

At block 880, the prior process reboots the workload domain. In the prior process, a reboot is necessary to implement the workload domain configuration settings updated at block 870. Since the applications are deployed for the user/client to use before the compliance is checked, any changes that are made to the workload domain configuration settings after the initial deployment require a reboot of the system in order to be implemented in the application.

At block 890, the prior process manages configuration updates for the virtual resources. The prior process of FIG. 8 then ends.

Figure 9:
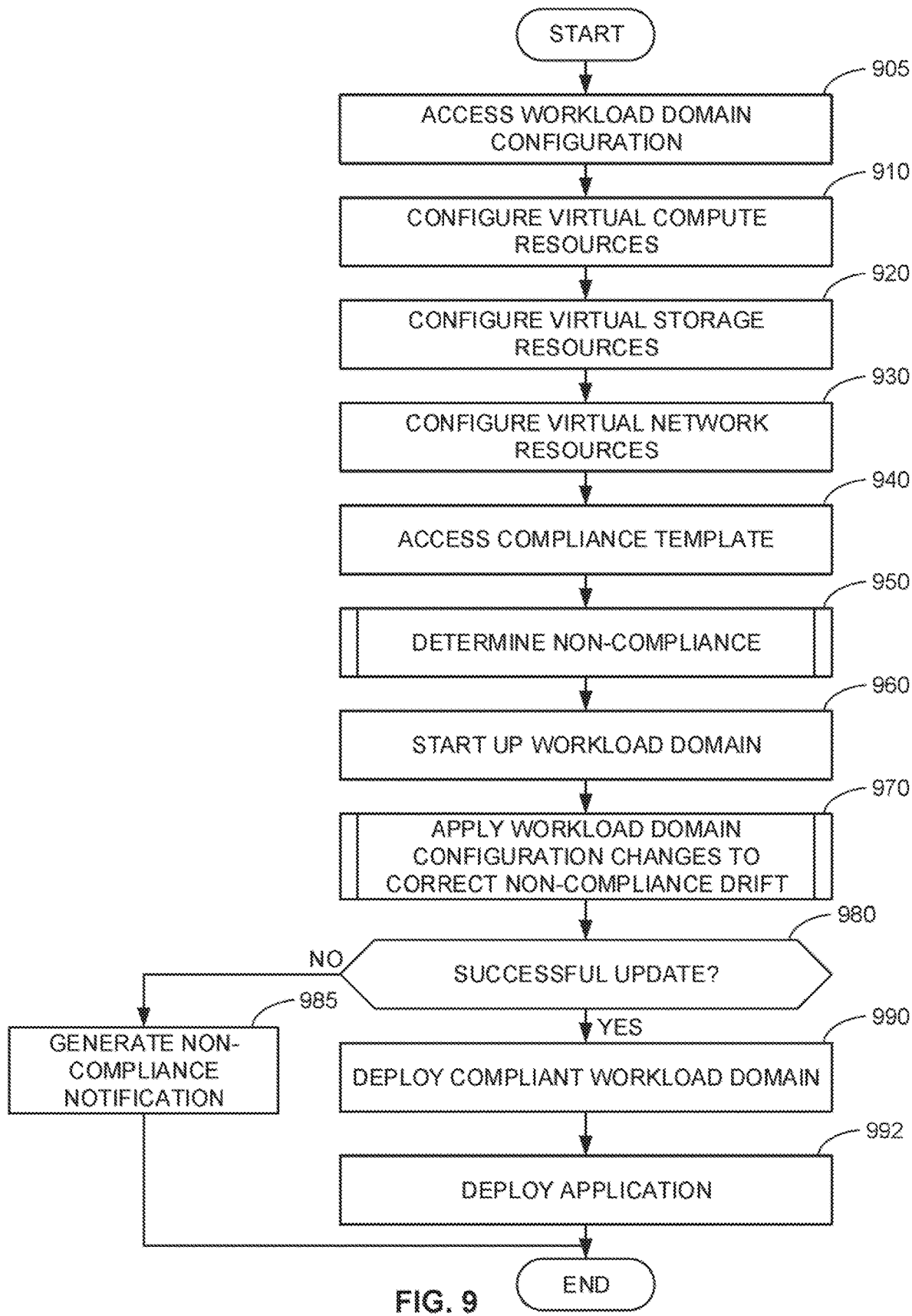
FIG. 9 is a flowchart representative of example machine readable instructions which may be executed to implement the example SDDC startup controller of FIG. 1 to deploy security-compliant workload domains in accordance with teachings of this disclosure.
Figure 10:
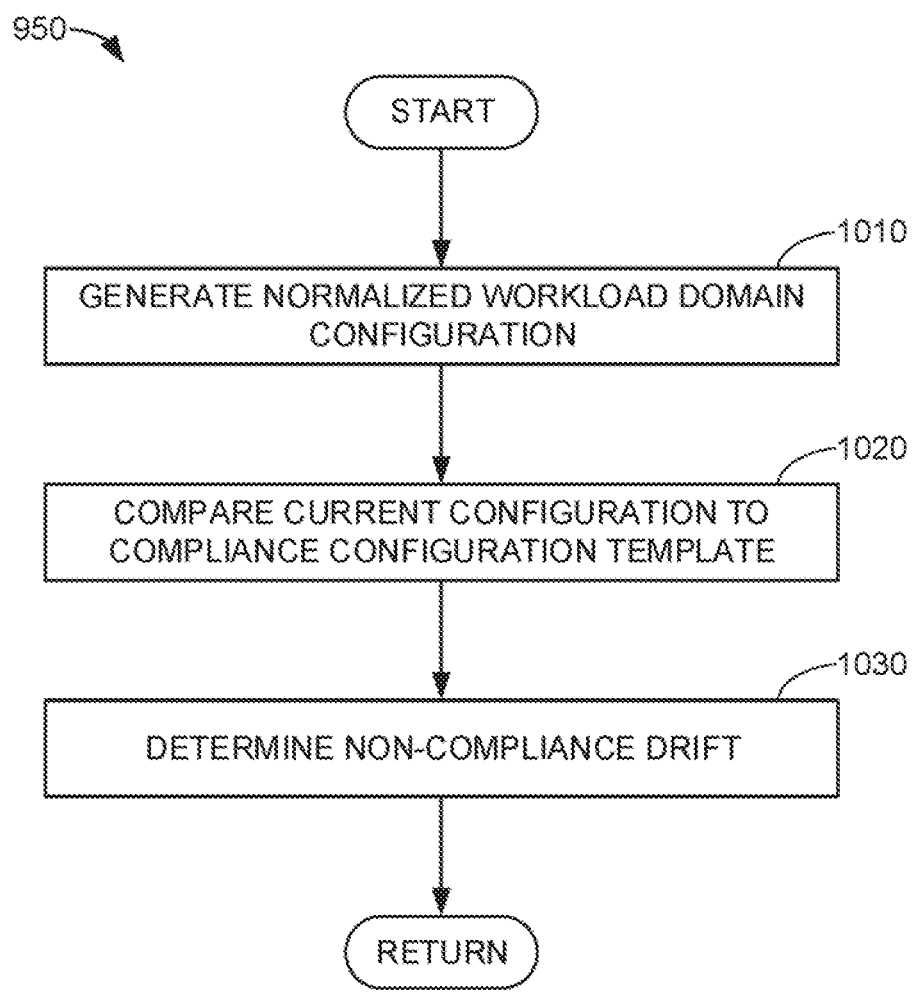
FIG. 10 is a flowchart representative of example machine readable instructions which may be executed to implement the example compliance detector of FIG. 2 to compute non-compliance of a workload domain.
Figure 11:
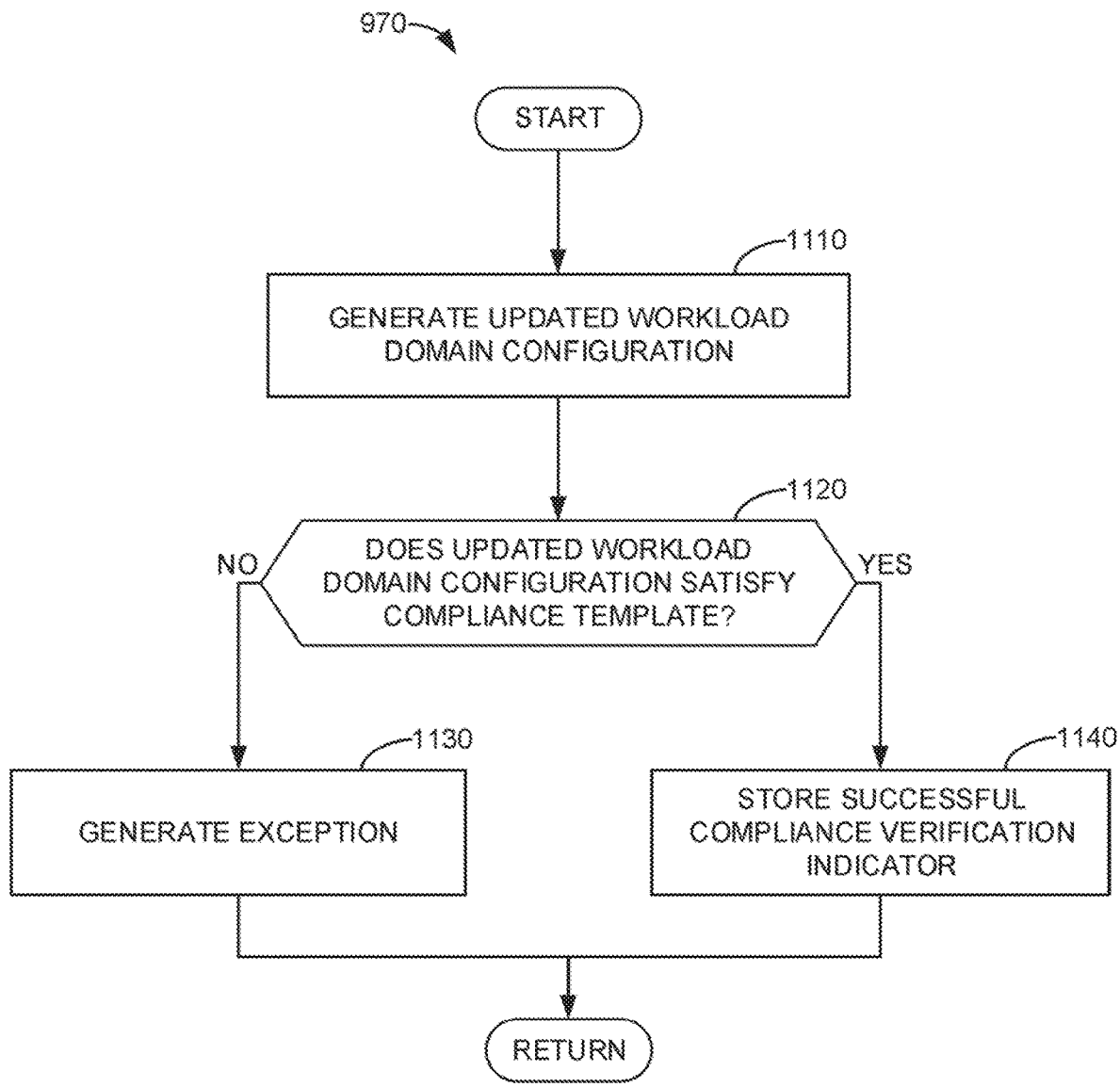
FIG. 11 is a flowchart representative of example machine readable instructions which may be executed to implement the example compliance governor of FIG. 3 to apply changes to correct non-compliance drift of a workload domain.

Flowcharts representative of example hardware logic, machine readable instructions, hardware implemented state machines, and/or any combination thereof for implementing the SDDC start-up controller 100 of FIG. 1 are shown in FIGS. 9, 10, and 11. The machine readable instructions may be one or more executable programs or portion(s) of one or more executable program for execution by a computer processor such as the processor 1212 shown in the example processor platform 1200 discussed below in connection with FIG. 12. The programs may be embodied in software stored on a non-transitory computer readable storage medium such as a CD-ROM, a floppy disk, a hard drive, a DVD, a Blu-ray disk, or a memory associated with the processor 1212, but the entirety of the program(s) and/or parts thereof could alternatively be executed by a device other than the processor 1212 and/or embodied in firmware or dedicated hardware. Further, although the example program(s) is/are described with reference to the flowcharts illustrated in FIGS. 9, 10, and 11, many other methods of implementing the example SDDC start-up controller 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In other examples, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In other examples, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9, 10 and 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, for example, a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine-readable instructions which may be executed to implement the example SDDC startup controller 100 of FIG. 1 to bring a workload domain 170 (FIG. 1) into compliance with configuration settings in a compliance template 140 (FIG. 1). The example program of FIG. 9 begins at block 905 at which the workload configuration controller 105 (FIG. 1) accesses the workload domain configuration. For example, the workload configuration controller 105 retrieves the workload domain configuration from a configuration template 135 in the local datastore 130 based on the function(s) and/or type of the application 180. In the illustrated example, the workload configuration controller 105 stores the workload domain configuration settings from the configuration templates 135 in the workload domain configuration buffer 230 (FIG. 2).

At blocks 910, 920, and 930 the example workload configuration controller 105 then configures the workload domain 170 based on the settings of the retrieved configuration template 135. At block 910, the example workload configuration controller 105 configures the virtual compute resources 190a. At block 920, the example workload configuration controller 105 configures the virtual storage resources 190b. At block 930, the example workload configuration controller 105 configures the virtual network resources 190c. The settings that are configured in the workload domain 170 by the workload configuration controller 105 are updated in the compute resources 190a, storage resources 190b, and networking resources 190c of the virtual resources 190 in the SDDC 160. For example, the plugins 360 (FIG. 3) configure the settings of the virtual resources 190 based on the workload domain configuration settings.

At block 940, the example compliance configuration controller 240 (FIG. 2) accesses the compliance templates 140 (FIG. 1). The example compliance configuration controller 240 selects a compliance template 140 based on the application 180 being deployed in the workload domain 170. For example, the application name or an application identifier of the application 180 may be stored in a lookup table in association with a name or identifier of a compliance template 140. In such examples the compliance configuration controller 240 uses the application name or application identifier to retrieve a corresponding one of the compliance templates 140 using the lookup table. In the illustrated example, the compliance configuration controller 240 can store the compliance configuration settings from the selected compliance template 140 in the example compliance configuration buffer 245.

At block 950, the compliance manager 260 (FIG. 2) determines the non-compliance. Example instructions that may be used to implement block 950 to determine non-compliance of the selected configuration template 135 relative to the selected compliance template 140 are described in more detail below in connection with FIG. 10. Although block 950 is described as determining non-compliance, if the compliance manager 260 determines there is no difference or substantially no difference between the workload domain configuration settings and the compliance configuration settings, the workload domain 170 is in full compliance. As such, the compliance manager 260 determines at block 950 that there is no non-compliance or zero non-compliance.

At block 960, the example compliance governor 120 (FIGS. 1 and 3) starts up the workload domain 170. For example, the example compliance governor 120 installs component software (e.g., ESXi software) in the workload domain 170.

At block 970, the example post start-up controller 330 (FIG. 3) applies workload domain configuration changes to correct any non-compliance drift. For example, the post start-up controller 330 uses the non-compliance drift results provided by the compliance manager 260 (FIG. 2) and uses the non-compliance drift to change the workload domain configuration settings in the workload domain configuration buffer 230. For example, the post start-up controller 330 generates updated workload domain configuration settings (e.g., compliant workload domain configuration settings) by modifying ones of the workload domain configuration settings. In the illustrated example, the updating of the ones of the workload domain configuration settings is based on the comparison of the normalized workload domain configuration settings with the compliance configuration settings. Example instructions that may be used to implement block 970 to apply workload domain configuration changes to correct the non-compliance drift of a workload domain are described below in connection with FIG. 11.

At block 980, the example post start-up orchestrator 320 (FIG. 3) determines if updating the workload domain configuration settings was successful. The example post start-up orchestrator 320 receives an indicator from the example compliance verifier 340 indicating whether the workload domain configuration settings were updated correctly or not. If the example post start-up orchestrator 320 receives an indicator that the update was successful, then program 900 continues to block 990. If the example post start-up orchestrator 320 receives an indicator that the update was not successful, then program 900 continues to block 985, where the example post start-up orchestrator 320 generates a non-compliance notification.

At block 985, the example post start-up orchestrator 320 generates a non-compliance notification to alert the user/client that the workload domain configuration settings are not compliant with the compliance configuration settings for the application 180 (FIG. 1). The non-compliance notification may be generated by setting a flag that indicates the workload domain configuration settings are not compliant after being checked by the compliance verifier 340 (FIG. 3). However, other methods of generating the notification may additionally or alternatively be used. The non-compliance notification may be presented to the user/client by a message box in a graphical user interface (GUI). However, other ways of presenting the notification to the user may additionally or alternatively be implemented.

At block 990, the SDDC start-up controller 100 (FIG. 1) deploys the compliant workload domain 170. For example, the SDDC start-up controller 100 configures the workload domain 170 using compliant workload domain configuration settings generated at block 970. When the workload domain 170 is deployed for running the application 180, the example plugin controller 350 manages the different plugins 360 that are assigned to the application 180. The example plugins 360 are provided to update and manage the settings of the different virtual resources 190 (e.g., the virtualized compute resources 190a, the virtualized storage resources 190b, and the virtualized networking resources 190c). The virtual resources 190 are updated by the plugins 360 to be configured with the security-compliant settings determined in the workload domain configuration. The workload domain 170 deploys the application 180 (block 992). By waiting to deploy the application 180 until after the workload domain 170 is compliant with security configuration settings, examples disclosed herein substantially reduce or eliminate the vulnerability created by the prior process 800 of FIG. 8. The example program of FIG. 9 then ends.

FIG. 10 is a flowchart representative of example machine-readable instructions which may be executed to implement the example compliance detector 110 of FIG. 2 to compute non-compliance of a workload domain. The example instructions represented in FIG. 10 may be used to implement block 950 of FIG. 9. The example program of FIG. 10 begins at block 1010 at which the configuration normalizer 280 (FIG. 2) generates a normalized workload domain configuration (e.g., the normalized workload domain configuration 420 of FIG. 4). In the illustrated example, the configuration normalizer 280 generates normalized workload domain configuration settings of a deployed workload domain based on a format of the compliance configuration settings. For example, the configuration normalizer 280 normalizes the workload domain configuration settings in the workload domain configuration buffer 230 to be in the same or substantially similar format as the settings in the compliance configuration buffer 245, as described above in connection with FIG. 4.

At block 1020, the example drift comparator 290 (FIG. 2) compares the normalized workload domain configuration to the compliance configuration template. In the illustrated example, the drift comparator 290 compares the normalized workload domain configuration settings before deploying an application in the workload domain 170 (FIG. 1). For example, the drift comparator 290 compares the normalized workload domain configuration 420 to the settings in the compliance configuration buffer 245, as described above in connection with FIG. 4.

At block 1030, the example drift comparator 290 (FIG. 2) determines the non-compliance drift. The example drift comparator 290 generates a non-compliance drift value output that represents the differences between the settings values in the workload domain configuration buffer 230 and the corresponding settings values in the compliance configuration buffer 245 based on the comparison performed at block 1020. For example, the drift comparator 290 can generate the non-compliance drift value and/or the drift comparison result 450 as described above in connection with FIG. 4. In some examples, the compliance manager 260 stores the non-compliance drift value and/or the drift comparison result 450 in a datastore such as the local datastore 250 of FIG. 2 and/or the local datastore 130 of FIG. 1. The example program of FIG. 10 ends and control returns to a calling function or process such as program 900 of FIG. 9.

FIG. 11 is a flowchart representative of example machine-readable instructions which may be executed to implement the example compliance governor 120 of FIG. 3 to apply changes to correct non-compliance drift of a workload domain. Example instructions represented in FIG. 11 can be used to implement block 970 of FIG. 9. The example program of FIG. 11 begins at block 1110 at which the post start-up controller 330 (FIG. 3) generates the updated workload domain configuration. In the example of FIG. 9, the post start-up controller 330 generates the updated workload domain configuration settings by modifying ones of the workload domain configuration settings based on the comparison of the normalized workload domain configuration settings with the compliance configuration settings. For example, the post start-up orchestrator 320 (FIG. 3) provides the non-compliance drift value and/or the drift comparison result 450 (FIG. 4) from the example compliance manager 260 (FIG. 2) to the post start-up controller 330. The example post start-up controller 330 uses indicators of the drift comparison result 450 to determine which settings values in the normalized workload domain configuration 420 (FIG. 4) did not match the settings values in the compliance configuration buffer 245 (FIG. 2). The example post start-up controller 330 updates the settings values in the normalized workload domain configuration 420 that were indicated as non-compliant to the correct value specified by the drift comparison result 450 and/or the compliance templates 140 (FIG. 1). In this manner, the example post start-up controller 330 provides settings in the normalized workload domain configuration 420 that are updated and compliant with the settings in the compliance configuration buffer 245.

At example block 1110 of FIG. 11, the example post start-up controller 330 updates the settings values in the normalized workload domain configuration 420 to facilitate a subsequent verification comparison with the compliance configuration settings in the compliance configuration buffer 245. In some examples, a compliant workload domain can be subsequently configured and deployed based on the updated (e.g., compliant) normalized workload domain configuration 420. In other examples, configuration settings values from the updated and compliant normalized workload domain configuration can be copied to the original workload domain configuration 410 to generate an updated (e.g., compliant) workload domain configuration 410 that can be used to configure and deploy a compliant workload domain.

At block 1120, the example compliance verifier 340 (FIG. 3) determines if the updated workload domain configuration satisfies the compliance template 140. The example compliance verifier 340 checks that the updated settings in the normalized workload domain configuration 420 are compliant with the settings in the compliance configuration buffer 245. The example compliance verifier 340 checks that the post start-up controller 330 updated the settings in the normalized workload domain configuration 420 correctly. For example, the compliance verifier 340 determines whether the updated workload domain configuration settings satisfy the compliance configuration settings.

If the compliance verifier 340 determines that the workload domain configuration settings were not updated correctly, the program of FIG. 11 continues to block 1130. At block 1130, the example compliance verifier 340 (FIG. 3) generates an exception. The example compliance verifier 340 provides the exception to the post start-up orchestrator 320 to indicate that the workload domain configuration settings are not compliant with the compliance configuration settings. The example compliance verifier 340 provides the exception to inhibit the workload domain 170 (FIG. 1) from being deployed for use. In some examples, the compliance verifier 340 stores a generated exception value in a register of the workload domain 170 to indicate that the workload domain configuration settings are not compliant with the compliance configuration settings. The example post start-up orchestrator 320 reads the register value in the workload domain 170, and does not deploy the workload domain 170 if the register contains the exception value. However, other ways of inhibiting the workload domain 170 from being deployed may additionally or alternatively be used.

If the compliance verifier 340 determines that the workload domain configuration settings were updated correctly, the updated workload domain configuration is deemed a compliant workload domain configuration, and the program of FIG. 11 continues to block 1140. At block 1140, the example compliance verifier 340 (FIG. 3) stores the successful compliance verification indicator. The example compliance verifier 340 stores the successful compliance verification indicator to provide the indicator to the post start-up orchestrator 320 to indicate that the workload domain configuration settings are compliant with the compliance configuration settings. The example compliance verifier 340 provides the successful compliance verification indicator to allow the workload domain 170 (FIG. 1) to be configured based on the complaint workload domain configuration settings and deployed for use.

After execution of either block 1130 or block 1140, the example program of FIG. 11 ends, and control returns to a calling function or process such as the example program 900 of FIG. 9.

Figure 12:
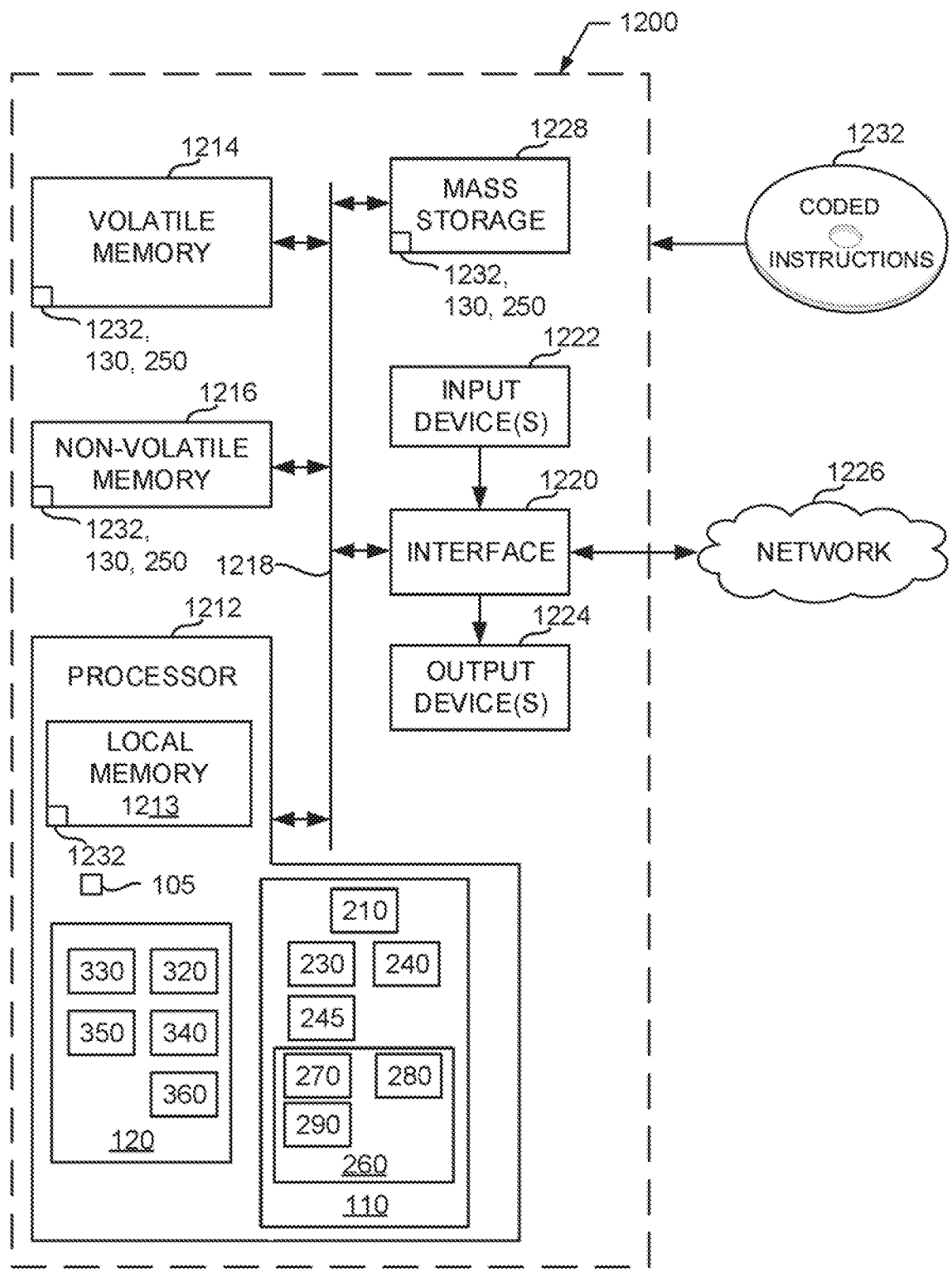
FIG. 12 is a block diagram of an example processing platform structured to execute the instructions of FIGS. 8, 9, 10 and/or 11 to implement the example SDDC startup controller of FIG. 1 to deploy security-compliant workload domains in accordance with teachings of this disclosure.

FIG. 12 is a block diagram of an example processor platform 1200 structured to execute the instructions of FIGS. 9, 10, and 11 to implement the SDDC start-up controller 100 of FIG. 1. The processor platform 1200 can be, for example, a server, a personal computer, a workstation, a self-learning machine (e.g., a neural network), an Internet appliance, a gaming console, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example workload configuration controller 105, the example compliance detector 110, the example compliance governor 120, the example compliance orchestrator 210, the example workload domain configuration buffer 230, the example compliance configuration controller 240, the example compliance configuration buffer 245, the example compliance manager 260, the example configuration analyzer 270, the example configuration normalizer 280, the example drift comparator 290, the example post start-up orchestrator 320, the example post start-up controller 330, the example compliance verifier 340, the example plugin controller 350, the example plugins 360 (e.g., the example vSphere plugin 360a, the example vSAN plugin 360b, and the example NSX plugin 360c).

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. The example local datastore 130 and the example local datastore 250 may be implemented by the one or more mass storage devices 1228 and/or by the volatile memory 1214 or non-volatile memory 1216.

Example machine executable instructions 1232 represented in FIGS. 9, 10, and 11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that deploy security-compliant workload domains. The disclosed methods, apparatus and articles of manufacture improve the efficiency of using a computing device by bringing a workload domain into compliant status with industry standards before the deployment of applications in the workload domain. The disclosed methods, apparatus and articles of manufacture substantially reduce or eliminate the duration of vulnerability when the workload domain is not compliant with industry security standards by bringing the workload domain into compliant status early in the deployment process. The disclosed methods, apparatus and articles of manufacture are accordingly directed to one or more improvement(s) in the functioning of a computer.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload domain may be deployed to any of the virtualization environments. Examples disclosed herein may analyze workload domains for any such virtualization environment to identify instances of non-compliance, and update workload domain configurations to deploy compliant workload domains.

Example methods, apparatus, systems, and articles of manufacture to deploy security-compliant workload domains are disclosed herein. Further examples and combinations thereof include the following:

Example 1 includes an apparatus to configure a workload domain for security compliance. The apparatus includes a configuration normalizer to generate normalized workload domain configuration settings by normalizing workload domain configuration settings of a deployed workload domain based on a format of compliance configuration settings, a drift comparator to compare the normalized workload domain configuration settings with the compliance configuration settings before deploying an application in the workload domain, a post start-up controller to generate updated workload domain configuration settings by modifying ones of the workload domain configuration settings, the modifying of the ones of the workload domain configuration settings being based on the comparison of the normalized workload domain configuration settings with the compliance configuration settings, and a compliance verifier to determine whether the updated workload domain configuration settings satisfy the compliance configuration settings.

Example 2 includes the apparatus of example 1, wherein the drift comparator is to compare the normalized workload domain configuration settings with the compliance configuration settings using a character-level comparison.

Example 3 includes the apparatus of example 1, wherein the drift comparator is to generate a label to indicate a mismatch between the normalized workload domain configuration settings and the compliance configuration settings.

Example 4 includes the apparatus of example 3, wherein the post start-up controller is to determine a corresponding one of the workload domain configuration settings to update based on the label.

Example 5 includes the apparatus of example 1, wherein the compliance verifier is to generate an exception when the updated workload domain configuration settings do not satisfy the compliance configuration settings.

Example 6 includes the apparatus of example 5, wherein the exception from the compliance verifier is to inhibit deployment of the workload domain.

Example 7 includes at least one non-transitory computer readable medium including instructions that, when executed, cause at least one processor to at least: generate normalized workload domain configuration settings by normalizing workload domain configuration settings of a deployed workload domain based on a format of compliance configuration settings, compare the normalized workload domain configuration settings with the compliance configuration settings before deploying an application in the workload domain, generate updated workload domain configuration settings by modifying ones of the workload domain configuration settings, the modifying of the ones of the workload domain configuration settings being based on the comparison of the normalized workload domain configuration settings with the compliance configuration settings, and determine whether the updated workload domain configuration settings satisfy the compliance configuration settings.

Example 8 includes the at least one non-transitory computer readable medium of example 7, wherein the instructions, when executed, cause the at least one processor to compare the normalized workload domain configuration settings with the compliance configuration settings using a character-level comparison.

Example 9 includes the at least one non-transitory computer readable medium of example 7, wherein the instructions, when executed, cause the at least one processor to generate a label to indicate a mismatch between the normalized workload domain configuration settings and the compliance configuration settings.

Example 10 includes the at least one non-transitory computer readable medium of example 9, wherein the instructions, when executed, cause the at least one processor to determine a corresponding one of the workload domain configuration settings to update based on the label.

Example 11 includes the at least one non-transitory computer readable medium of example 7, wherein the instruction, when executed, cause the at least one processor to generate an exception when the updated workload domain configuration settings do not satisfy the compliance configuration settings.

Example 12 includes the at least one non-transitory computer readable medium of example 11, wherein the exception is to inhibit deployment of the workload domain.

Example 13 includes an apparatus to configure a workload domain for security compliance. The apparatus includes means for generating normalized workload domain configuration settings by normalizing workload domain configuration settings of a deployed workload domain based on a format of compliance configuration settings, means for comparing the normalized workload domain configuration settings with the compliance configuration settings before deploying an application in the workload domain, means for generating updated workload domain configuration settings by modifying ones of the workload domain configuration settings, the modifying of the ones of the workload domain configuration settings being based on the comparison of the normalized workload domain configuration settings with the compliance configuration settings, and means for determining whether the updated workload domain configuration settings satisfy the compliance configuration settings.

Example 14 includes the apparatus of example 13, wherein the means for comparing is to compare the normalized workload domain configuration settings with the compliance configuration settings using a character-level comparison.

Example 15 includes the apparatus of example 13, wherein the means for comparing is to generate a label to indicate a mismatch between the normalized workload domain configuration settings and the compliance configuration settings.

Example 16 includes the apparatus of example 15, wherein the means for generating the updated workload domain configuration settings is to determine a corresponding one of the workload domain configuration settings to update based on the label.

Example 17 includes the apparatus of example 13, wherein the means for determining is to generate an exception when the updated workload domain configuration settings do not satisfy the compliance configuration settings.

Example 18 includes the apparatus of example 17, wherein the exception is to inhibit deployment of the workload domain.

Example 19 includes a method to configure a workload domain for security compliance. The method includes generating normalized workload domain configuration settings by normalizing workload domain configuration settings of a deployed workload domain based on a format of compliance configuration settings, comparing the normalized workload domain configuration settings with the compliance configuration settings before deploying an application in the workload domain, generating updated workload domain configuration settings by modifying ones of the workload domain configuration settings, the modifying of the ones of the workload domain configuration settings being based on the comparison of the normalized workload domain configuration settings with the compliance configuration settings, and determining whether the updated workload domain configuration settings satisfy the compliance configuration settings.

Example 20 includes the method of example 19, wherein the comparing of the normalized workload domain configuration settings with the compliance configuration settings is based on a character-level comparison.

Example 21 includes the method of example 19, further including generating a label to indicate a mismatch between the normalized workload domain configuration settings and the compliance configuration settings.

Example 22 includes the method of example 21, further including determining a corresponding one of the workload domain configuration settings to update based on the label.

Example 23 includes the method of example 19, further including generating an exception when the updated workload domain configuration settings do not satisfy the compliance configuration settings.

Example 24 includes the method of example 23, wherein the exception is to inhibit deployment of the workload domain.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to configure a workload domain for security compliance, the apparatus comprising:
a configuration normalizer to generate normalized workload domain configuration settings by normalizing workload domain configuration settings of a deployed workload domain based on a format of compliance configuration settings;
a drift comparator to compare the normalized workload domain configuration settings with the compliance configuration settings before deploying an application in the workload domain;
a post start-up controller to generate updated workload domain configuration settings by modifying ones of the workload domain configuration settings, the modifying of the ones of the workload domain configuration settings being based on the comparison of the normalized workload domain configuration settings with the compliance configuration settings; and
a compliance verifier to determine whether the updated workload domain configuration settings satisfy the compliance configuration settings.

2. The apparatus of claim 1, wherein the drift comparator is to compare the normalized workload domain configuration settings with the compliance configuration settings using a character-level comparison.

3. The apparatus of claim 1, wherein the drift comparator is to generate a label to indicate a mismatch between the normalized workload domain configuration settings and the compliance configuration settings.

4. The apparatus of claim 3, wherein the post start-up controller is to determine a corresponding one of the workload domain configuration settings to update based on the label.

5. The apparatus of claim 1, wherein the compliance verifier is to generate an exception when the updated workload domain configuration settings do not satisfy the compliance configuration settings.

6. The apparatus of claim 5, wherein the exception from the compliance verifier is to inhibit deployment of the workload domain.

7. At least one non-transitory computer readable medium comprising instructions that, when executed, cause at least one processor to at least:
generate normalized workload domain configuration settings by normalizing workload domain configuration settings of a deployed workload domain based on a format of compliance configuration settings;
compare the normalized workload domain configuration settings with the compliance configuration settings before deploying an application in the workload domain;
generate updated workload domain configuration settings by modifying ones of the workload domain configuration settings, the modifying of the ones of the workload domain configuration settings being based on the comparison of the normalized workload domain configuration settings with the compliance configuration settings; and
determine whether the updated workload domain configuration settings satisfy the compliance configuration settings.

8. The at least one non-transitory computer readable medium of claim 7, wherein the instructions, when executed, cause the at least one processor to compare the normalized workload domain configuration settings with the compliance configuration settings using a character-level comparison.

9. The at least one non-transitory computer readable medium of claim 7, wherein the instructions, when executed, cause the at least one processor to generate a label to indicate a mismatch between the normalized workload domain configuration settings and the compliance configuration settings.

10. The at least one non-transitory computer readable medium of claim 9, wherein the instructions, when executed, cause the at least one processor to determine a corresponding one of the workload domain configuration settings to update based on the label.

11. The at least one non-transitory computer readable medium of claim 7, wherein the instruction, when executed, cause the at least one processor to generate an exception when the updated workload domain configuration settings do not satisfy the compliance configuration settings.

12. The at least one non-transitory computer readable medium of claim 11, wherein the exception is to inhibit deployment of the workload domain.

13. An apparatus to configure a workload domain for security compliance, the apparatus comprising:
    means for generating normalized workload domain configuration settings by normalizing workload domain configuration settings of a deployed workload domain based on a format of compliance configuration settings;
    means for comparing the normalized workload domain configuration settings with the compliance configuration settings before deploying an application in the workload domain;
    means for generating updated workload domain configuration settings by modifying ones of the workload domain configuration settings, the modifying of the ones of the workload domain configuration settings being based on the comparison of the normalized workload domain configuration settings with the compliance configuration settings; and
    means for determining whether the updated workload domain configuration settings satisfy the compliance configuration settings.

14. The apparatus of claim 13, wherein the means for comparing is to compare the normalized workload domain configuration settings with the compliance configuration settings using a character-level comparison.

15. The apparatus of claim 13, wherein the means for comparing is to generate a label to indicate a mismatch between the normalized workload domain configuration settings and the compliance configuration settings.

16. The apparatus of claim 15, wherein the means for generating the updated workload domain configuration settings is to determine a corresponding one of the workload domain configuration settings to update based on the label.

17. The apparatus of claim 13, wherein the means for determining is to generate an exception when the updated workload domain configuration settings do not satisfy the compliance configuration settings.

18. The apparatus of claim 17, wherein the exception is to inhibit deployment of the workload domain.

19. A method to configure a workload domain for security compliance, the method comprising:
    generating normalized workload domain configuration settings by normalizing workload domain configuration settings of a deployed workload domain based on a format of compliance configuration settings;
    comparing the normalized workload domain configuration settings with the compliance configuration settings before deploying an application in the workload domain;
    generating updated workload domain configuration settings by modifying ones of the workload domain configuration settings, the modifying of the ones of the workload domain configuration settings being based on the comparison of the normalized workload domain configuration settings with the compliance configuration settings; and
    determining whether the updated workload domain configuration settings satisfy the compliance configuration settings.

20. The method of claim 19, wherein the comparing of the normalized workload domain configuration settings with the compliance configuration settings is based on a character-level comparison.

21. The method of claim 19, further including generating a label to indicate a mismatch between the normalized workload domain configuration settings and the compliance configuration settings.

22. The method of claim 21, further including determining a corresponding one of the workload domain configuration settings to update based on the label.

23. The method of claim 19, further including generating an exception when the updated workload domain configuration settings do not satisfy the compliance configuration settings.

24. The method of claim 23, wherein the exception is to inhibit deployment of the workload domain.

* * * * *